(12) United States Patent
Andersen

(10) Patent No.: US 9,376,933 B2
(45) Date of Patent: Jun. 28, 2016

(54) APPARATUS FOR DISTRIBUTING FLUID INTO A GAS TURBINE

(76) Inventor: Leonard M. Andersen, New York, NY (US)

( * ) Notice: Subject to any disclaimer, the term of this patent is extended or adjusted under 35 U.S.C. 154(b) by 1098 days.

(21) Appl. No.: 13/458,658

(22) Filed: Apr. 27, 2012

(65) Prior Publication Data

US 2012/0272635 A1 Nov. 1, 2012

Related U.S. Application Data

(60) Provisional application No. 61/457,603, filed on Apr. 29, 2011.

(51) Int. Cl.
| | |
|---|---|
| *F02C 7/12* | (2006.01) |
| *F02C 7/16* | (2006.01) |
| *F01D 25/12* | (2006.01) |
| *F01D 25/24* | (2006.01) |
| *F02C 3/30* | (2006.01) |
| *F02C 7/143* | (2006.01) |
| *F01D 25/08* | (2006.01) |

(52) U.S. Cl.
CPC ............... *F01D 25/12* (2013.01); *F01D 25/24* (2013.01); *F02C 3/305* (2013.01); *F02C 7/16* (2013.01); *F01D 25/08* (2013.01); *F02C 7/12* (2013.01); *F02C 7/1435* (2013.01); *Y02E 20/16* (2013.01); *Y02T 50/671* (2013.01); *Y02T 50/675* (2013.01)

(58) Field of Classification Search
CPC ............ F02C 7/12; F02C 7/16; F02C 7/1435; F02C 3/305; F01D 25/24; F01D 25/08
See application file for complete search history.

(56) References Cited

U.S. PATENT DOCUMENTS

| | | | | | |
|---|---|---|---|---|---|
| 3,286,641 | A | * | 11/1966 | Delao | B63H 11/103 415/150 |
| 4,224,790 | A | * | 9/1980 | Christensen | F02K 7/16 60/224 |
| 5,105,625 | A | * | 4/1992 | Bell, III | F01D 25/005 60/39.83 |
| 5,129,783 | A | * | 7/1992 | Hayton | F01D 5/284 415/209.2 |
| 5,624,231 | A | * | 4/1997 | Ohtomo | F01D 5/186 415/115 |
| 5,704,762 | A | * | 1/1998 | Schultze | F01D 9/042 415/200 |
| 6,125,980 | A | * | 10/2000 | Ruth | F16D 41/12 192/46 |

(Continued)

FOREIGN PATENT DOCUMENTS

JP 02108822 A * 4/1990

*Primary Examiner* — William H Rodriguez
*Assistant Examiner* — Eric Linderman
(74) *Attorney, Agent, or Firm* — Leason Ellis LLP

(57) ABSTRACT

Additional thrust fuel efficiency is provided for a gas turbine system that includes a first member(s) (e.g., a support for a rotating main shaft) that is attached to a stationary casing. The rotating main shaft is attached to the first member through a bearing. A second member is associated with a rotating member, such as a motor or other rotating part of the main or other shaft. The first member has a flow path in it for the liquid (e.g. water and/or other volatile liquid) and has an opening (nozzle) for discharging the liquid. The second member has a liquid impinging member for generating a liquid spray, droplet, mist optimally, which vaporizes with hot combustion gases that flow exteriorly along the main shaft. In this form vaporization is quick and is less erosive. The volume of thrust gases is increased advantageously and likewise engine boost increases.

14 Claims, 16 Drawing Sheets

(56) References Cited

U.S. PATENT DOCUMENTS

| | | | | |
|---|---|---|---|---|
| 6,702,547 B2* | 3/2004 | Tiemann | F01D 5/085 | |
| | | | 415/115 | |
| 6,835,046 B2* | 12/2004 | Strassberger | F01D 5/184 | |
| | | | 416/97 R | |
| 7,163,369 B2* | 1/2007 | Bruce | F01D 17/162 | |
| | | | 415/160 | |
| 8,668,437 B1* | 3/2014 | Liang | F01D 5/14 | |
| | | | 415/115 | |
| 8,806,874 B2* | 8/2014 | Onoda | F01D 9/041 | |
| | | | 415/115 | |
| 9,004,853 B2* | 4/2015 | Puerta | F04D 27/0215 | |
| | | | 415/116 | |
| 2005/0100438 A1* | 5/2005 | Trewin | F01D 9/065 | |
| | | | 415/116 | |
| 2009/0158739 A1* | 6/2009 | Messmer | F01K 21/047 | |
| | | | 60/648 | |
| 2009/0185903 A1* | 7/2009 | Beeck | F01D 5/145 | |
| | | | 416/91 | |
| 2010/0098537 A1* | 4/2010 | Hamana | F01D 9/041 | |
| | | | 415/209.3 | |
| 2011/0005196 A1* | 1/2011 | Andersen | F02C 3/305 | |
| | | | 60/264 | |
| 2011/0072827 A1* | 3/2011 | Ciofini | F01D 5/082 | |
| | | | 60/772 | |
| 2011/0083444 A1* | 4/2011 | Bathina | F02C 3/22 | |
| | | | 60/776 | |

* cited by examiner

APPARATUS FOR DISTRIBUTING FLUID INTO A GAS TURBINE

CROSS-REFERENCE TO RELATED APPLICATION

The present application claims the benefit of U.S. patent application Ser. No. 61/457,603, filed Apr. 29, 2011, which is hereby incorporated by reference in its entirety.

BACKGROUND

The present invention relates generally to the thrust boosting (increasing) of gas turbine engine by introducing water or other volatile liquids.

In the jet engine and the turbine engine technical fields, there has been a constant endeavor to increase energy output per unit of fuel. Generally, in a gas turbine installation, a part of compressed air generated from a compressor is used for turbine cooling. Thus, an improvement in power efficiency and an increase in an output of a gas turbine system can be achieved by increasing the cooling capability of cooling air and reducing the amount of compressed air required for cooling. To that end, a technique for reducing the flow rate of compressed air required for cooling blades is practiced. A turbine blade cooling circuit is often used. However, the high pressure from the compressor makes it difficult for the turbine blade cooling circuit to operate in an ideal manner.

A gas turbine or jet engine typically includes a compressor assembly for compressing a working fluid, such as air. The compressed air is flowed into a combustor which heats the fluid causing it to expand. The expanded fluid is then forced through the turbine.

The output of known gas turbine engines is limited by an operating temperature of the working fluid at the output of the compressor assembly. At least some known turbine engines include compressor cooling devices, such as intercoolers, to extract heat from the compressed air to reduce the operating temperature of the flow exiting the compressor. As a result of the decreased temperatures, increased power output can be achieved by increasing flow through the compressor assembly.

To facilitate additional cooling, at least some gas turbine engines include water injection systems that overcome some of the shortcomings associated with intercoolers. Such systems use a plurality of nozzles to inject water into the flow during engine operation.

The essential goal in designing the jet engine has always been to produce more thrust and fuel efficiency to achieve turbine durability (that is, an improved component life). To do so, the combustor needs to operate at a higher temperature, which requires cooling the turbine. This concept therefore dates back years. Fuel efficiency can further be enhanced by cooling the turbine blades with airflow or liquid-flow into gas (steam) through them. Afterburners provide a means for an emergency boost; however, they suffer from fuel inefficiency relative to the other working components of the turbine.

FIG. 1 illustrates a conventional driven apparatus 100 that contains an engine and in particular, the apparatus 100 is in the form of an aircraft that includes a turbine engine 200. However, the present invention is not limited to being used in an aircraft and it will be appreciated that it equally can be used in other gas turbine settings including a vehicle, ship, electrical power generation, etc. As shown in FIG. 2, the turbine engine 200 includes a number of components some of which can be broadly categorized and identified as a compressor 300, a combustion chamber 400, a fuel burner 500, a turbine 600, and a nozzle 700. FIG. 2 illustrates one exemplary form of a turbine engine in the form of a jet engine, a turbojet, a gas turbine, a ramjet, or a scramjet engines; however, it will be appreciated that the turbine engine 200 can be of another engine type.

FIG. 2 illustrates an overview of the jet engine 200, wherein air 210 is drawn into the turbojet by the high by-pass fan 250 and the compressor 300. The compressor 300 is basically a large spinning fan. The compressor slows down the incoming air, raising its pressure, and delivers it to the combustion chamber 400. Fuel is injected into the high-pressure air in the combustion chamber and ignited by the fuel burner 500. The resulting hot gases 410 expand and rush first through the turbine 600 and then through the nozzle or exhaust section 700 located at the rear. A rotating shaft 800 may connect all the above components to provide momentum when rotating. A forward thrust is generated as a reaction to the rearward momentum of the exhaust gases.

The turbine 600 includes a series of bladed discs that act similar to a windmill, gaining energy from the hot gases 410 leaving the combustor. Some of this energy is used to drive the compressor, and in some turbine engines (i.e., turboprop, turboshaft or turbofan engines), energy is extracted by additional turbine discs and used to drive devices such as propellers, bypass fans, helicopter rotors or electrical generators. These series of bladed discs are known as turbine blades.

FIG. 2 also illustrates various components of the turbine engine 200 showing detailed view of the turbine 600, including various blades 602 and 602a. The hot exhaust 410 acts on the turbine blades 602, while leaving the combustion chamber 400 causing the turbine blades to spin around. A forward thrust is generated as a reaction to the rearward momentum of the exhaust gases when the hot gasses 410 rush toward the blades leaving the nozzle (exhaust section) 700. The turbine 600 is designed to provide mechanical energy and rotation to the compressor.

The purpose of the turbine is to provide momentum to the compressor 300 that is attached by the rotating shaft 800, thereby enabling the compressor 300 to continually draw in more air. Thus, the air that is compressed in the compressor 300 and then heated in the combustion chamber 400 is not only used to provide a forward thrust but also to drive the turbine 600 that drives the compressor 300 that compresses the air.

The difficulty with making the exhaust gases drive a turbine 600 is that the forward thrust depends upon the difference in pressure between the closed and open ends of the combustion chamber 400, and if the escaping gases have to push against an object (e.g., the turbine blades) that difference in pressure is lessened. In other words, a pressure at the rear of the system detracts from the forward thrust. Thus, the designer's aim in a turbojet engine is to reduce to a minimum the power taken by the turbine 600 to compress the air so that the maximum amount of forward thrust is available.

Thus, the combination of air/fuel mixtures as typically occurs in gas turbine combination system generates heat. This result is gas volume increase the turbine section of the gas turbine engine extracting mechanical energy.

The introduction of pure water as part of a solution has been part gas turbine technology over the recent years and the present Applicant has a pending patent application pertaining to water addition to gas turbine engines for increasing thrust output and/or increasing fuel efficiency. The present Applicant's U.S. patent application Ser. No. 12/724,863, filed Mar. 16, 2010, and entitled "Method and Apparatus for Increasing Thrust or Other Useful Energy Output of Devices with A Rotating Element" is incorporated herein by reference in its entirety. This application discloses water going into the hot part (containing combustion gases) of a gas turbine engine with a seal containing said water being acted by the main shaft or other shaft.

The present invention is directed to achieve the benefit with increased pressurization of the water, lower cost of the equipment, a reduction in weight and less complexity.

SUMMARY

In accordance with one aspect, the present invention relates to a gas turbine system with a liquid (e.g. water) flow that is discharged into a gas flow parallel to a main shaft of the turbine system. The liquid is discharged from a support of the rotating main shaft using a pressurized spray nozzle. On the main shaft there is part of the shaft or piece rotating with it (at the same speed) that the liquid contacts and causes further dispersion of the liquid. This results in the creation of liquid droplets of reduced size (e.g., a mist) that has a swirling flow path about a center axis of the main shaft and is followed downstream by a great increase in the rate of the liquid going to steam (the gaseous phase of water). This is achieved without or lessening of erosive affects as mentioned in many patents. An increase in thrust gas volume results and this increase in the thrust gas volume can be utilized for aircraft take off and/or in normal operations. In addition to a boost for fuel engine wear saving is realized. According to another embodiment, the present system can be used the combined cycling as described in Applicant's '863 patent application or systems of an energy extractive turbine after the gas turbine engine unit. The extractive turbine has errosiveness of the liquid reduced or eliminated, and pursuant to an imposed swirling, the liquid (water) entitles (droplet, mist) evaporizing faster less volume with associated heat loss.

BRIEF DESCRIPTION OF THE DRAWING FIGURES

FIG. 15b is a cross-sectional view taken along the line 15b-15b of FIG. 15a;

FIG. 15c is a cross-sectional view taken along the line 15c-15c of FIG. 15a; and FIG. 15d is a cross-sectional view taken along the line 15d-15d of FIG. 15a.

DETAILED DESCRIPTION OF CERTAIN EMBODIMENTS

Exemplary embodiments that incorporate one or more aspects of the present invention are described below with reference to the drawings. These illustrated examples are not intended to be a limitation on the present invention. For example, one or more aspects of the present invention can be utilized in other embodiments and even other types of devices. Moreover, certain terminology is used herein for convenience only and not to be taken as a limitation on the present invention.

Figure 1:
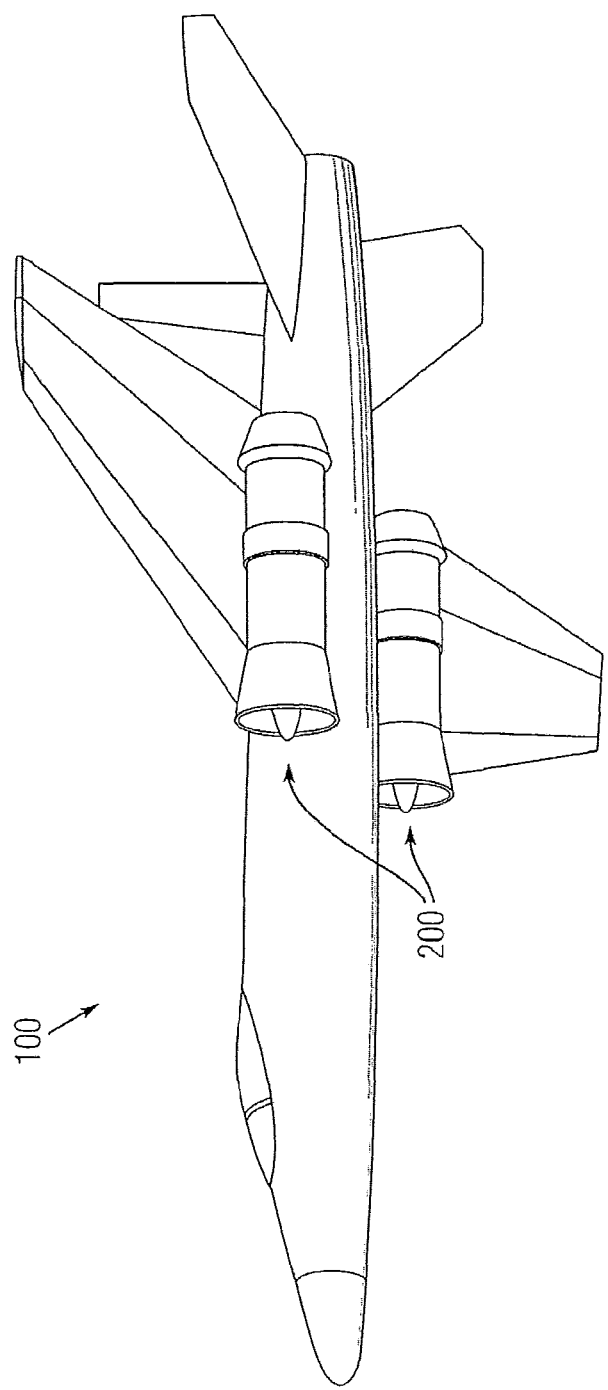
FIG. 1 is a schematic view of a conventional aircraft.
Figure 2:
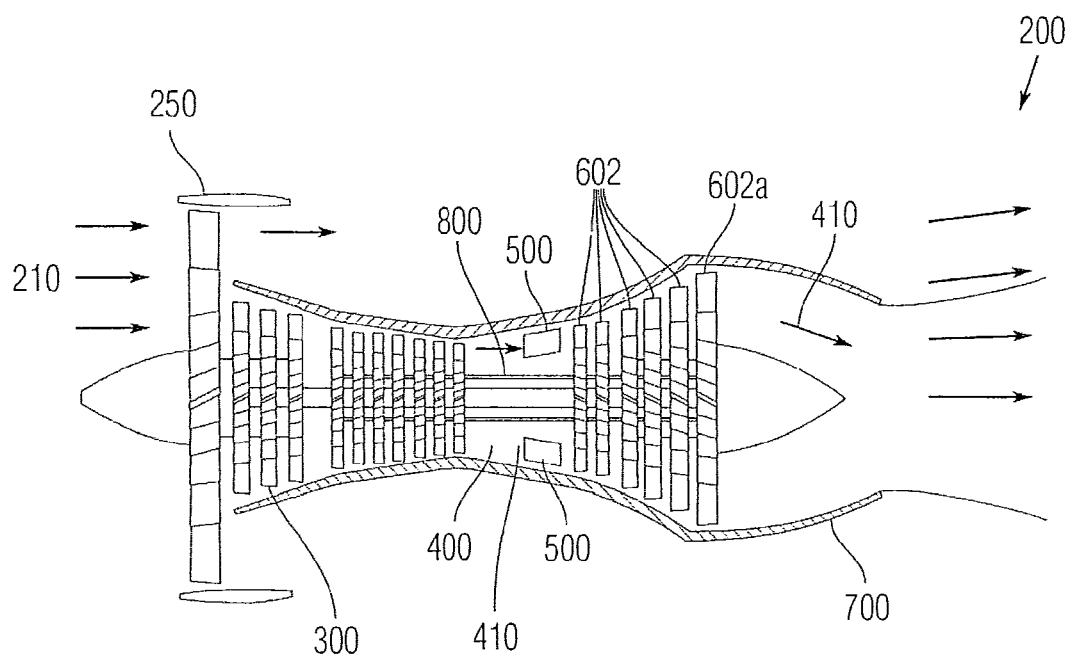
FIG. 2 illustrates various components of the conventional turbine engine.
Figure 3:
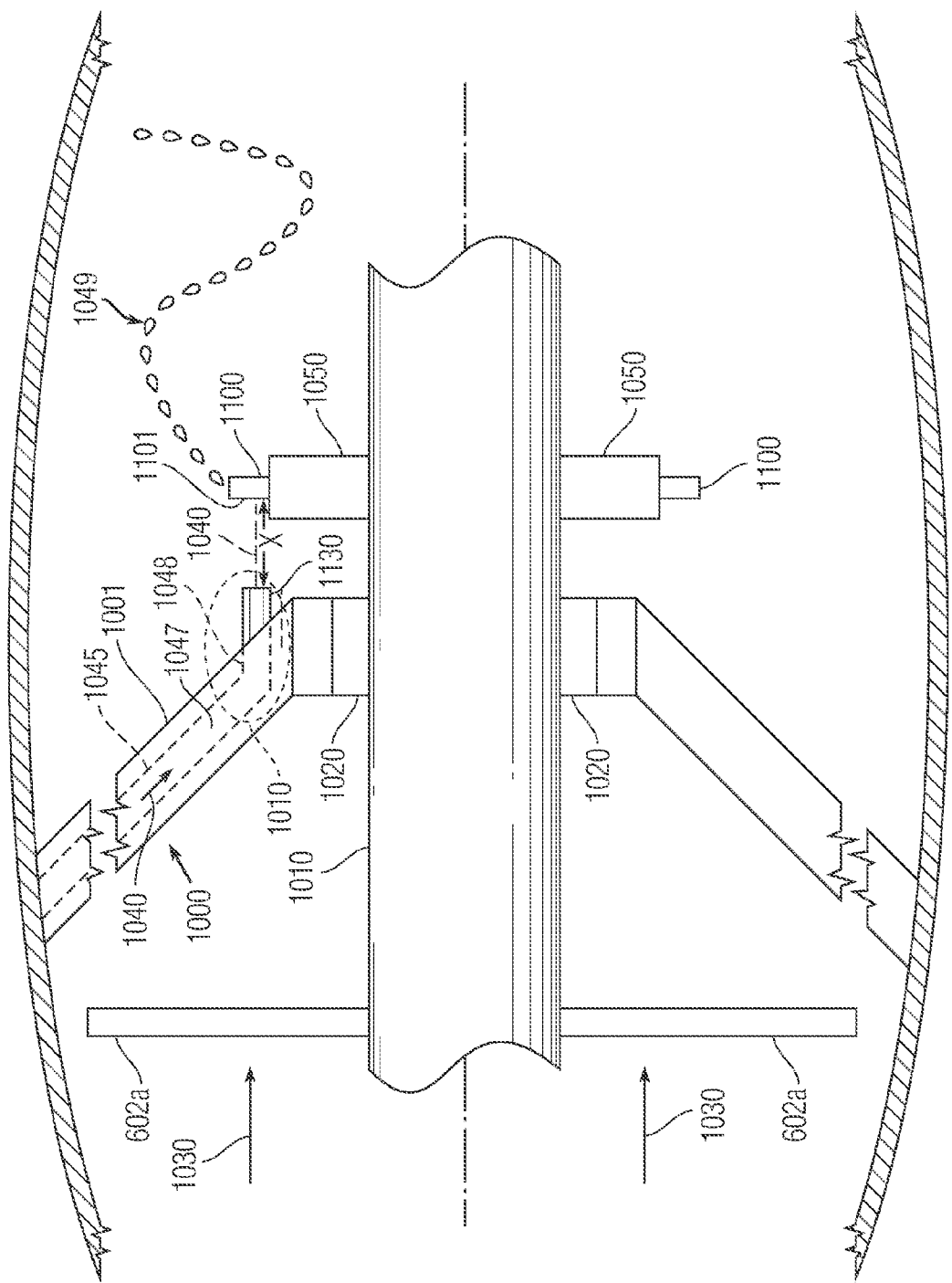
FIG. 3 is a schematic representation of gas turbine system after a compressor section that includes an example of the present invention.

Referring to FIG. 3, a support section of gas turbine system located after the compressor section thereof is generally indicated at 1000. The support section 1000 is the part of a gas turbine casing which can be defined as an outer part containing a rotating main shaft 1010 and turbine blades (e.g., blades 602 in FIG. 2) as well as other operating parts. As will be appreciated, the main shaft 1010 moves the compressor blade(s) and the turbine blades 602, etc. The support section 1000 which represents an extension of the casing is thus stationary to the casing that holds the main shaft 1010 and therefore, the support section 1000 is free of rotation, while the main shaft 1010 is a rotating component. A bearing assembly or the like 1020 is held (supported) by the section 1000 and serves to support the rotating main shaft 1010 in such a way that the main shaft 1010 can freely rotate relative to the section 1000 and the gas turbine casing. The main shaft 1010 is thus typically held in a horizontal manner as shown and extends in a longitudinal direction. For purpose of illustration of one embodiment of the present invention, FIG. 3 depicts the section 1000 of the gas turbine system as being located downstream of the turbine blades 602.

Arrow 1030 indicates a flow of gas and one will appreciate that the direction of gas flow 1030 is at least substantially parallel to the main shaft 1010 in at least a location after the compressor section of the gas turbine.

In accordance with the present invention, a liquid (fluid), generally indicated by arrow 1040, is delivered under pressurization towards the main shaft 1010. More specifically and as described in more detail below, the section 1000 includes a conduit 1045 for carrying, under pressure, the liquid 1040. The conduit 1045 is formed internally within the section 1000 and can be in the form of a bore of channel that is formed within the section 1000. The liquid 1040 can be any number of different liquids that are suitable for the intended application as described herein. For example, the liquid 1040 can be in the form of water or another volatile liquid that flows within conduit 1045 towards the main shaft 1010 under pressurization.

As shown in FIG. 3, the main shaft 1010 includes a protrusion or portion 1050 that extends radially outward therefrom. The portion 1050 is thus integrally attached to and part of the main shaft 1010 and can take any number of different forms. In the illustrated embodiment, the portion 1050 has an annular shape (e.g., ring shaped) and extends about the main shaft 1010. The portion 1050 is located proximate to the bearing 1020 and to an interface between the section 1000 and the bearing 1020. The portion 1050 is thus located more distally along the shaft 1010. In other words, the portion 1050 is located downstream of the section 1000 as measured in the direction of gas flow 1030. The portion 1050 thus rotates at the same speed as the main shaft 1010.

The portion 1050 also includes a means 1100 for contacting (impinging) the liquid 1040 as it is discharged from the conduit 1045 as described below. It will be understood that the means 1100 can be located at any number of different locations along the shaft 1010. In particular, the means 1100 can be located downstream of the turbine blades 602a. Alternatively, the means 1100 can be located between the combustion section and the turbine blades 602a or alternatively, the means 1100 can even be located between turbine blades 602a.

The portion 1100 extends radially outward from the portion 1050 and can take any number of different forms, as described herein, so long as the portion 1050 is configured to contact and cause the liquid 1040 to undergo a change in the form thereof. More specifically, the portion 1050 is designed to contact the liquid 1040 and cause it to be transformed into droplet (mist) form. In other words, when a discharged stream of the liquid 1040 contacts the moving portion 1040, the liquid stream 1040 is converted into drop form and thus, a liquid mist/liquid droplet dispersion is initially formed and travels in a swirling flow pattern about the center axis of the main shaft 1010 with a longer than straight path (afterburner systems). Since the surrounding environment is defined by and includes hot combustion gases, the mist (reduced sized liquid dispersion) created by the liquid impinging surface turns to gas (steam in the case when the liquid is water). The size of the droplets can vary depending upon a number of different considerations and in one embodiment, the liquid droplets have a size ranging from about 10 micron size to about 60 micron size (e.g., between about 10 micron size to about 30 micron size). It will be appreciated that the above dimensions are merely exemplary in nature and the liquid droplets can have other sizes outside of the above exemplary range. As described below, the liquid droplets contact the hot combustion gases, thereby generating a gas 1049 (e.g. steam). The action of the liquid impinging member and the above described swirling pattern of the reduced drop sized liquid formed thereby facilitates a desired compact complete volatilization occurrence.

Figure 14A:
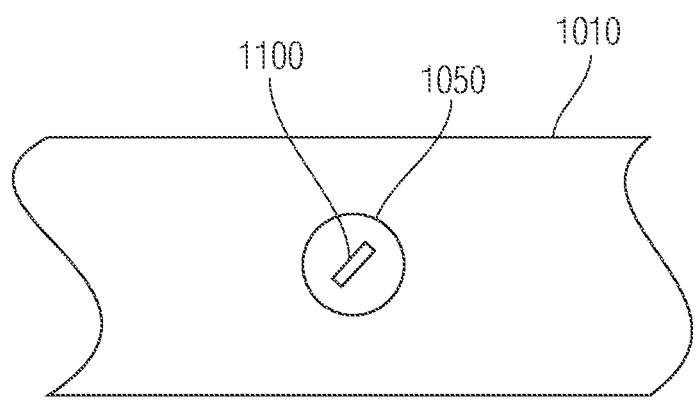
FIG. 14a is top plan view of a rotatable liquid impinging means relative to the rotating main shaft and being shown in a first position.
Figure 14B:
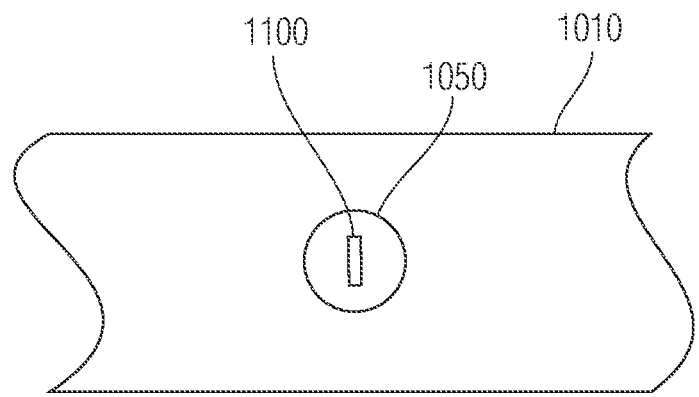
FIG. 14b is top plan view of the rotatable liquid impinging means relative to the rotating main shaft and being shown in a second position.
Figure 14C:
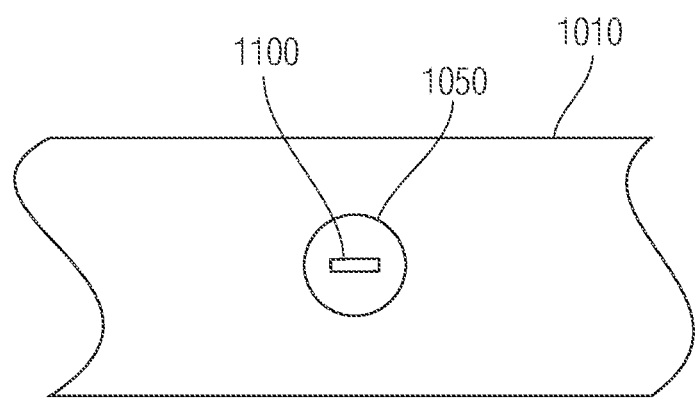
FIG. 14c is a top plan view of the rotatable liquid impinging means relative to the rotating main shaft and being shown in a third position.

It will also be appreciated that the portion 1100 (liquid impinging member) can movable relative to the shaft 1010 in order to change the relative position of the portion 1100 to main shaft 1010. For example, the portion 1100 can be rotated relative to the main shaft 1010 and/or extended or moved toward the centerline of the main axis of the shaft 1010. For example, as shown in FIG. 14a-c, the portion 1100 can be rotated relative to the main shaft 1010 in order to adjust the angle of the portion 1100 relative to the centerline of the main shaft 1010. In FIG. 14a, the portion 1100 is set at a 45 degree angle relative to the center axis of the main shaft 1010 and this influences the manner in which the liquid spray 1049 is formed after contacting the liquid impinging member 1100. FIG. 14b, the portion 1100 is set at a 90 degree angle relative to the center axis of the main shaft 1010. In FIG. 14c, the portion 1100 is set at a position that is substantially parallel (180 degrees) relative to the center line of the main shaft 1010.

It will be appreciated that any number of different controllable mechanical means (including hydraulic systems) can be used for rotating the liquid impinging member 1100 relative to the main shaft 1010 so that it assumes a predetermined angle relative thereto. A controller is in communication with the mechanical means to allow precise and controllable movement of the means 1100 to one of the possible positions thereof.

Depending upon the operational state of the aircraft (or device in which the portion 1100 is integrated therein), the portion 1100 can be pivoted into any number of different positions, such as the positions of FIGS. 14a-c. For example, the portion 1100 can be set in the position of FIG. 14a during takeoff of the aircraft; the portion 1100 can be set in the position of FIG. 14b during engine start-up or taxiing; and the portion 1100 can be set in the position of FIG. 14c during reduced power consumption operation (e.g., during cruising). This type of rotational motion is similar to a change in aircraft propeller pitch depending upon and in view of certain events, such as takeoff, cruising, etc.

It will also be appreciated that the flow of liquid through the system of the present invention is controllable and can be suspended during certain events, such as during cruising conditions (low power) of the aircraft.

It will also be understood that the portion 1100 can be linked to the rotating speed of the main shaft 1010 or it can be unlinked.

Figure 14D:
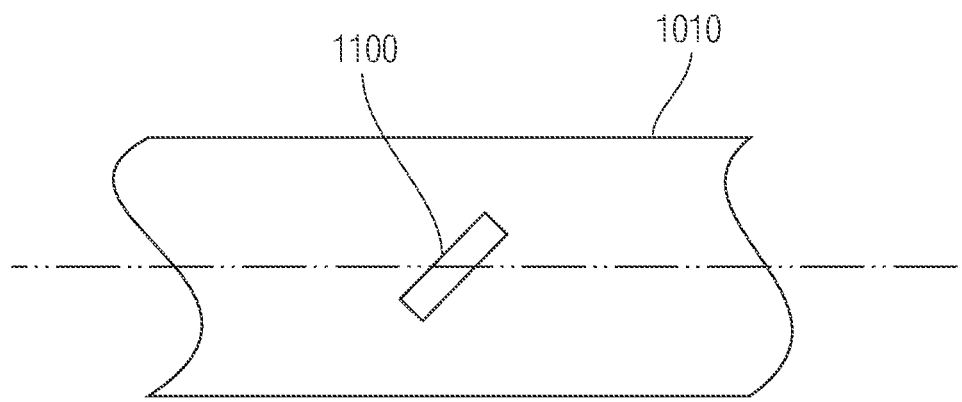
FIG. 14d is a top plan view of a rotatable liquid impinging means according to another embodiment.

FIG. 14d illustrates that the protrusion 1050 can be eliminated and the pin 1100 can be rotatable relative to the main shaft 1010. In this design, the pin 1100 is directly and rotatably coupled to the main shaft 1100. For example, the coupling between the pin 1100 and the main shaft 1010 can be via a drive shaft or the like which can be rotated to cause rotation of the pin 1100 relative to the main shaft 1010.

Figure 4:
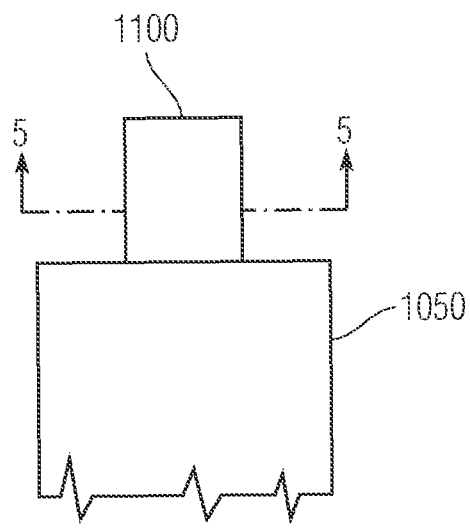
FIG. 4 is an enlarged side elevation view of the system encircled by the dashed line 4-4 on FIG. 3 and shows a liquid impinging device according to a first embodiment.
Figure 5:
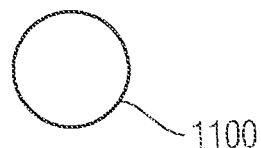
FIG. 5 is a cross-sectional view of the liquid impinging device according to the first embodiment taken along line 5-5 of FIG. 4.

In one exemplary embodiment, shown in FIGS. 4-5, the portion 1100 can be in the form of a pin like structure that extends radially outward from the portion 1050 and can take an annular shape similar to the portion 1050. The pin 1100 can have a rounded exterior and in particular, as shown in FIG. 5, the pin 1100 can be a cylindrical shaped pin. However, it will be appreciated that the pin 1100 can take any number of other shapes besides a cylindrical shape.

The portion 1050, in this case, the pin 1100 is designed to act as a means for impinging the liquid flow 1040 and causes a change in the state thereof. In particular, as mentioned above, the hot thrust gas flows in the direction of arrow 1030. More specifically, the hot thrust gas flows parallel to the longitudinally extending main shaft 1010. The hot thrust gas flowing in the direction of arrow 1030 thus contact (impinges upon) the radially extending pin 1100 which acts as an impinging surface that is in the way of the flow of the hot thrust gas and as described below is in the way of the flow of the discharged liquid 1040. The impingent created by the pin 1100 causes the liquid 1040 to change form and subdivide (reduction in droplet size and change is specific surface area) and in particular, the discharged high pressure stream of liquid contacts the rotating pin 1100 with such force and speed and in the environment of the hot trust gas that the liquid stream 1040 becomes a spray mist 1049 defined by droplet dispersion. In other words, the liquid stream is converted into droplets which can have a size that yields a defined spray mist being formed. The spray mist 1049 results downstream of the rotating pin 1100. The spray mist 1049 can assume a swirling pattern.

In yet another embodiment, the pin 1100 or other similar structure including the other liquid impinging members disclosed herein can be actuated by rotational movement of the main shaft 1010. In other words, the pin 1100 can be biased (spring-loaded) and whereupon centrifugal movement of the main shaft 1010 causes extension of the pin 1100 to an extended position due to centrifugal activation (rotation of the main shaft). Alternatively, the extension of the surface impinging member (such as the pin 1100) can be achieved mechanically.

Figure 14E:
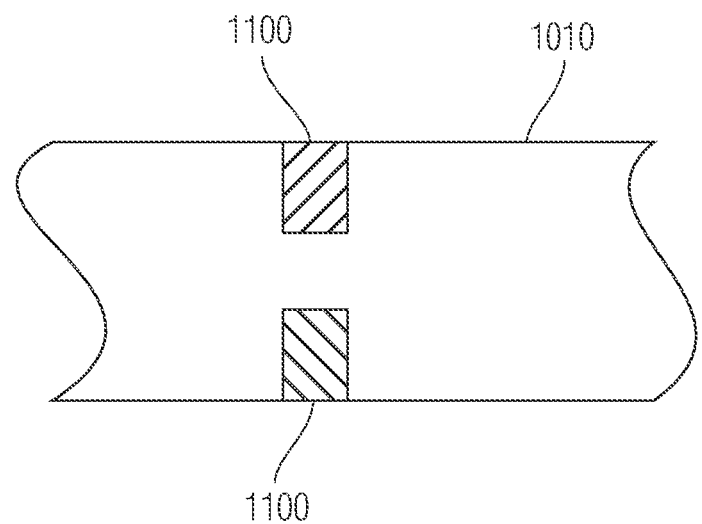
FIG. 14e is a cross-sectional view of a liquid impinging means relative to the rotating main shaft and being shown in a retracted position.
Figure 14F:
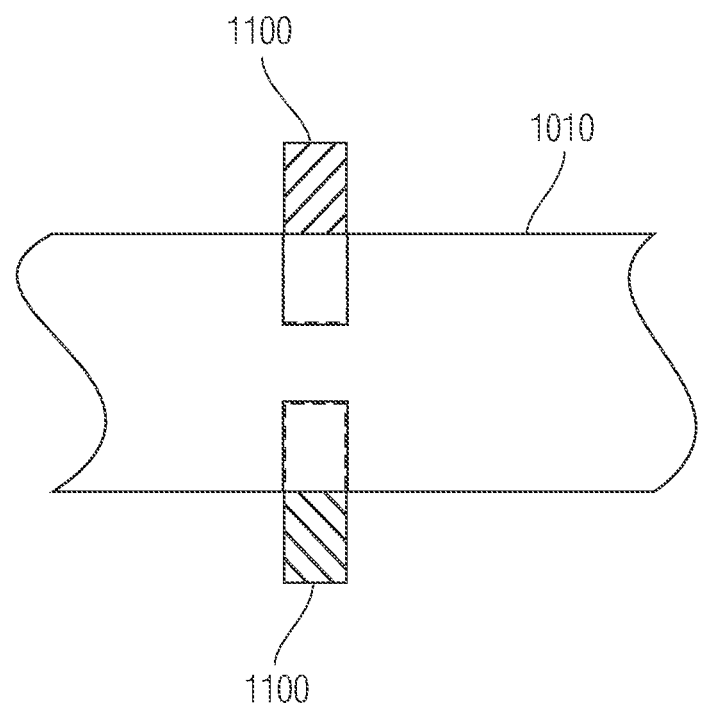
FIG. 14f is a cross-sectional view of a liquid impinging means relative to the rotating main shaft and being shown in an extended position.
Figure 14G:
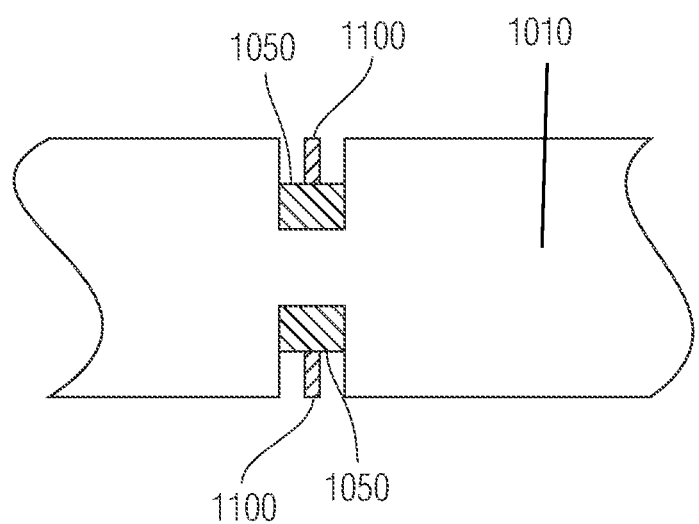
FIG. 14g is a cross-sectional view of a liquid impinging means relative to the rotating main shaft and being shown in a retracted position.

In yet another embodiment, a mechanism is provided for extending and retracting the pin 1100 (or any of the other liquid impingement members described herein) independent of the speed of the main shaft 1010. For example, FIG. 14*e* shows the pin 1100 (or other liquid impinging member) being disposed in a retracted position within the shaft 1010 and under mechanical means and via a controller, the pin 1100 is moved to an extended position shown in FIG. 14*f*. FIG. 14*g* shows a retractable/extendable protrusion 1050 and pin 1100 extending radially outward from the protrusion 1050. In this embodiment, the pin 1100 is rotatable relative to the protrusion 1050 to allow the position of the pin 1100 to be varied (similar to how the pin 1100 is rotated as discussed with reference to FIGS. 14*a-c*). Thus, once the protrusion 1050 and pin 1100 is placed in the extended position, the pin 1100 can be rotated to a desired position relative to the main shaft 1010 and similar to that discussed with reference to FIGS. 14*a-c*.

As mentioned above, the liquid 1040 flows within conduit 1045 under pressurization towards the main shaft 1010 and in particular, towards the interface between section (portion) 1000 and bearing 1020.

The precise shape and location of the conduit 1045 can vary depending upon the particular application and the design of the portion 1000. For example, as shown, the conduit 1045 extends along a length of the section 1000 and can have multiple different sections having different shapes/orientations. In the illustrated embodiment, the conduit 1045 has a first section 1048 that extends along the length of the portion 1000 towards the main shaft 1010 and a second section 1049 that is formed at an angle relative to the first section 1048 and extends towards and to a trailing edge 1001 of the portion 1000. The second section 1048 can be formed at a right angle relative to the first section 1047 as shown. The conduit 1045 is thus in the form of a bore or channel that carries the liquid under pressure to the trailing edge 1001.

The trailing edge 1001 of the portion 1000 represents the location at which the conduit 1045 opens to atmosphere and thus is the location at which the pressurized liquid 1040 is discharged. At the trailing edge 1001, a nozzle 1130, such as a spray nozzle, is disposed and serves to spray the pressurized liquid 1040 into droplets (mist) which is generally indicated at 1041.

It will be appreciated that the nozzle 1130 faces the front (leading) surface 1101 of the pin 1100 and in particular, there is a short distance X between the nozzle 1130 and the leading edge 1101. As the liquid spray 1041 travels this distance it is at least generally flowing in a direction parallel the longitudinal direction of the main shaft 1010.

The present invention provides a means to get the benefit of the heat energy bearing gas at 700-900° F. by generating thrust gas steam with water introduced at a high state of subdivision and traveling along a non-linear path (swirl path). This results as discussed below from the liquid impinging means 1100 (e.g. pin 1100). As discussed in detail below, the liquid impinging means 1100 can take any number of different forms so long as the intended function is performed.

In FIG. 4-5, the liquid impinging means 1100 is in the form of a cylindrical pin that is used as a liquid impinging surface. The pin 1100 is a low cost liquid impinging structure that is functional and provides the intended results.

Figure 6:
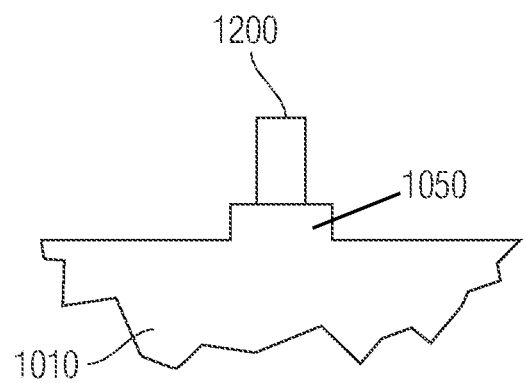
FIG. 6 is an enlarged front elevation view of a liquid impinging device according to a second embodiment.
Figure 7:
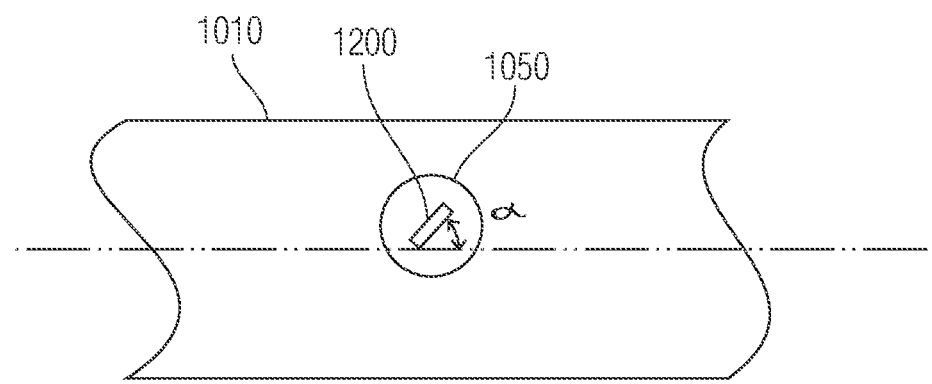
FIG. 7 is a top plan view of the liquid impinging device according to the second embodiment taken.

FIGS. 6-7 illustrate a liquid impinging means according to a second embodiment and in particular, a paddle type structure (deflector) 1200 is used as a liquid impinging surface. More cost and possibly a more advantageous water droplet travel path. FIG. 6 is front elevation view looking from the spray nozzle 1130. FIG. 7 is a top plan view showing a center line axis of the shaft 1010. As will be appreciated, the structure 1200 is in the form of a planar structure that is angled relative to the portion 1050 similar to how pin 1100 extended. The structure 1200 is disposed at an angle α other than 90 degrees relative to the center line of the main shaft 1010. In one embodiment, the structure 1200 is formed at a 45 degree angle (α) relative to the center axis of the main shaft and thus, structure 1200 is at a 45 degree angle relative to the flow of both hot gas and the liquid discharged from the nozzle 1130.

In another embodiment, the structure 1200 can be formed at a pivot angle relative to the portion 1050 such that the structure 1200 is angled not only relative to the center line axis of the main shaft but also pivoted at an angle relative to the portion 1050.

As explained below, the structure 1200 can be rotatably relative to the portion 1050 or alternatively, the combined integral components formed of the portion 1050 and the structure 1200 can be rotatable relative to the shaft 1010 as described herein.

As with the pin 1100, the structure 1200 is designed as a liquid impinging surface to create a droplet dispersion yielding a mist or the like defined by fine liquid droplets.

Figure 8:
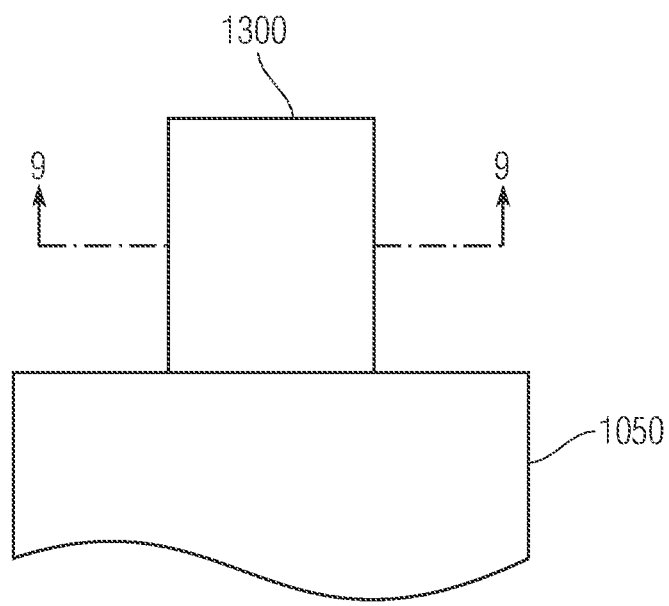
FIG. 8 is an enlarged front elevation view of a liquid impinging device according to a third embodiment.
Figure 9:
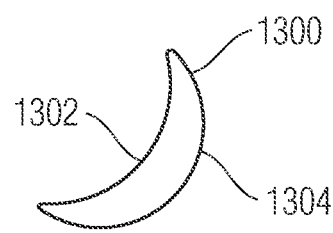
FIG. 9 is a cross-sectional view of the liquid impinging device according to the third embodiment taken along the line 9-9 of FIG. 8.

FIGS. 8 and 9 illustrate a structure 1300 that serves as a liquid impinging means according to a third embodiment of the present invention. As shown best in the cross-sectional view of FIG. 9, the structure 1300 is a curved structure having a first face 1302 and an opposing second face 1304, with the first face 1302 facing the nozzle 1130. The first face 1302 has a concave shape, while the second face 1304 has a convex shape. The concave (curved) shape of the first face 1302 serves to direct the liquid. The first face 1302 is thus a leading face that directly faces the nozzle 1130, while the second face 1304 is a trailing face. The shape of the liquid impinging structure 1300 causes the liquid (e.g. water) and gas mixture to have a rotation on an axis perpendicular to the main shaft 1010.

It will also be understood that the structure 1300 can be formed, similar to structure 1200, at an angle relative to a horizontal axis (such as the central axis of the main shaft) and in particular, the curved structure is disposed at an angle other than 90 degrees (e.g., it can be disposed at an angle of 45 degrees). This angle is also relative to the flow of the gas and also the general flow of the discharged liquid.

Figure 10:
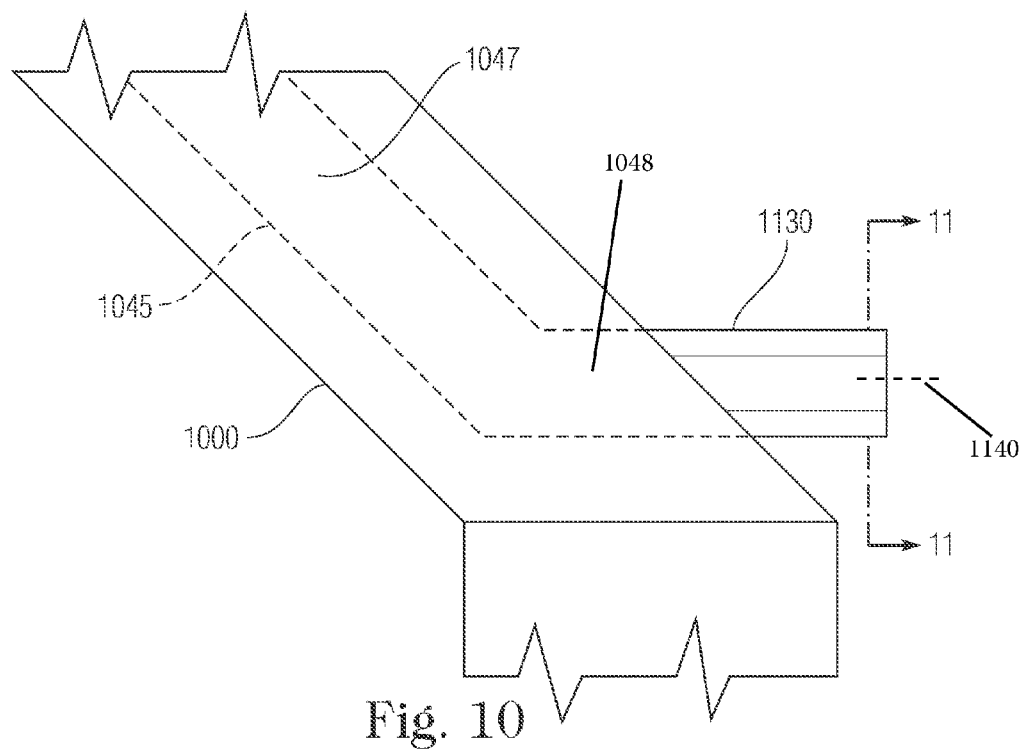
FIG. 10 is an enlarged cross-sectional view of the system encircled by the dashed line 10-10 on FIG. 3 depicting a spray nozzle and showing one exemplary embodiment.

FIG. 10 is an enlarged cross-sectional view of a section of the portion 1000 and the nozzle 1130. As can be seen, the liquid (e.g., water) flowing within the conduit 1045 is discharged through the nozzle 1130 such that is flows into the hot combustion gas in a manner in which the liquid flow direction is parallel to the main shaft 1010. This results in a spray setup for discharging the liquid in spray form from the nozzle 1130 along the trailing edge 1001 of the portion 1000.

Figure 11:
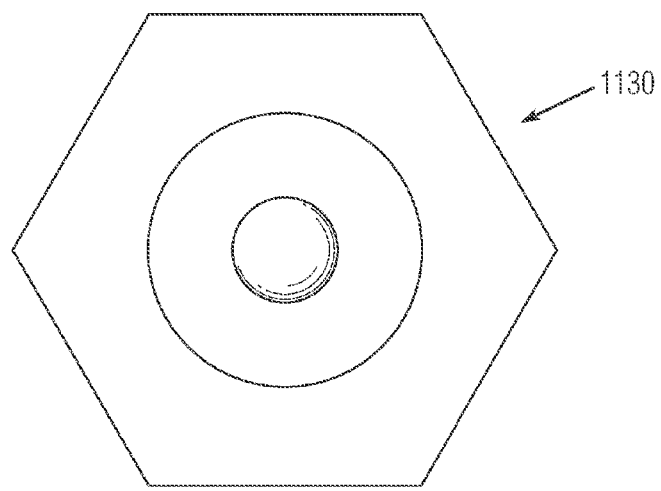
FIG. 11 is an enlarged, cross-sectional top plan view taken along the line 11-11 of FIG. 10.

FIG. 11 is a detailed illustration of one exemplary nozzle 1130 for discharging the liquid 1040 from the trailing edge 1001 of the portion 1000. The spray nozzle 1130 is a device that facilitates dispersion of liquid into a spray (in other words, the nozzle receives the pressurized liquid stream produces a spray of small droplet size). Nozzles are conventionally used for three purposes: to distribute a liquid over an area, to increase liquid surface area, and create impact force on a solid surface. There are a number of different types of nozzles, including but not limited to: a plain orifice type nozzle, a shaped orifice nozzle, a surface impingement single fluid nozzle, a pressure-swirl single fluid spray nozzle, a solid cone single-fluid nozzle, a compound nozzle, etc.

The surface impingement means (e.g., devices 1100, 1200, 1300) serves to further disperse the spray that is formed and discharged by the nozzle 1130.

Figure 12:
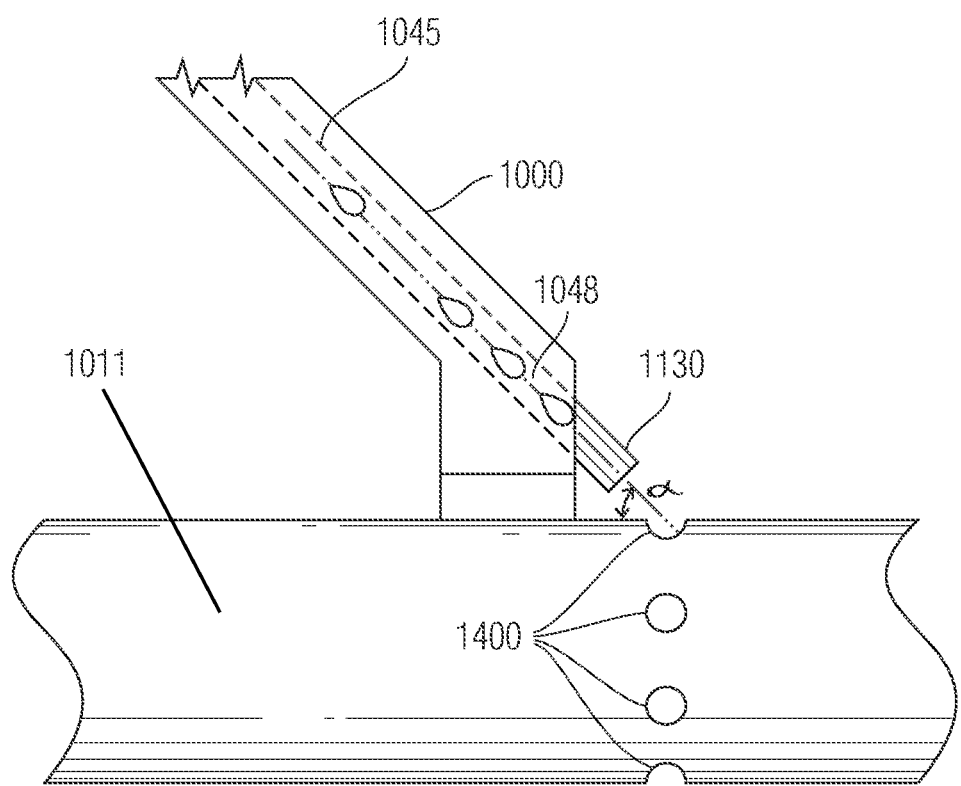
FIG. 12 is a cross-sectional side view of another liquid impinging means associated with the rotating main shaft.

Now referring to FIG. 12, a surface impinging member 1400 according to another embodiment is shown. In this embodiment, the second section 1048 of the conduit 1045 is not formed at a 90 degree angle relative to the first section 1047 but instead, the second section 1048 is formed at an angle other than 90 degrees. For example, the second section 1048 can be formed such that the angle between a center axis of the second section 1048 and the central axis of the main shaft 1010 is about 45 degrees as shown by the legend (a) in FIG. 12. In this embodiment, the main shaft 1010 defines the liquid impinging member and in particular, an exterior surface 1011 of the main shaft 1010 includes at least one notch (indent) or groove 1400 formed therein. For example, the liquid impinging member 1400 can be in the form of an annular shaped groove or it can be in the form of a series (plurality) of discrete indents (as shown) formed circumferentially about the exterior surface 1011 of the main shaft 1010. The indents are formed to have at least one curved surface (e.g., they can be concave shaped) that promotes the liquid impingement process and creates the desired liquid droplets of reduced size (mist, etc.).

The notches (indents) 1400 are formed such that the liquid discharged from the conduit section 1048 (and through nozzle 1130) contacts the indents 1400 which are rotating and the curved surface of indent 1400 causes deflection of the discharged liquid and creation of the liquid droplets of reduced size (mist, etc.).

In this embodiment, the shaft 1010 itself acts as the impinging member and defines the impinging surface.

Figure 13:
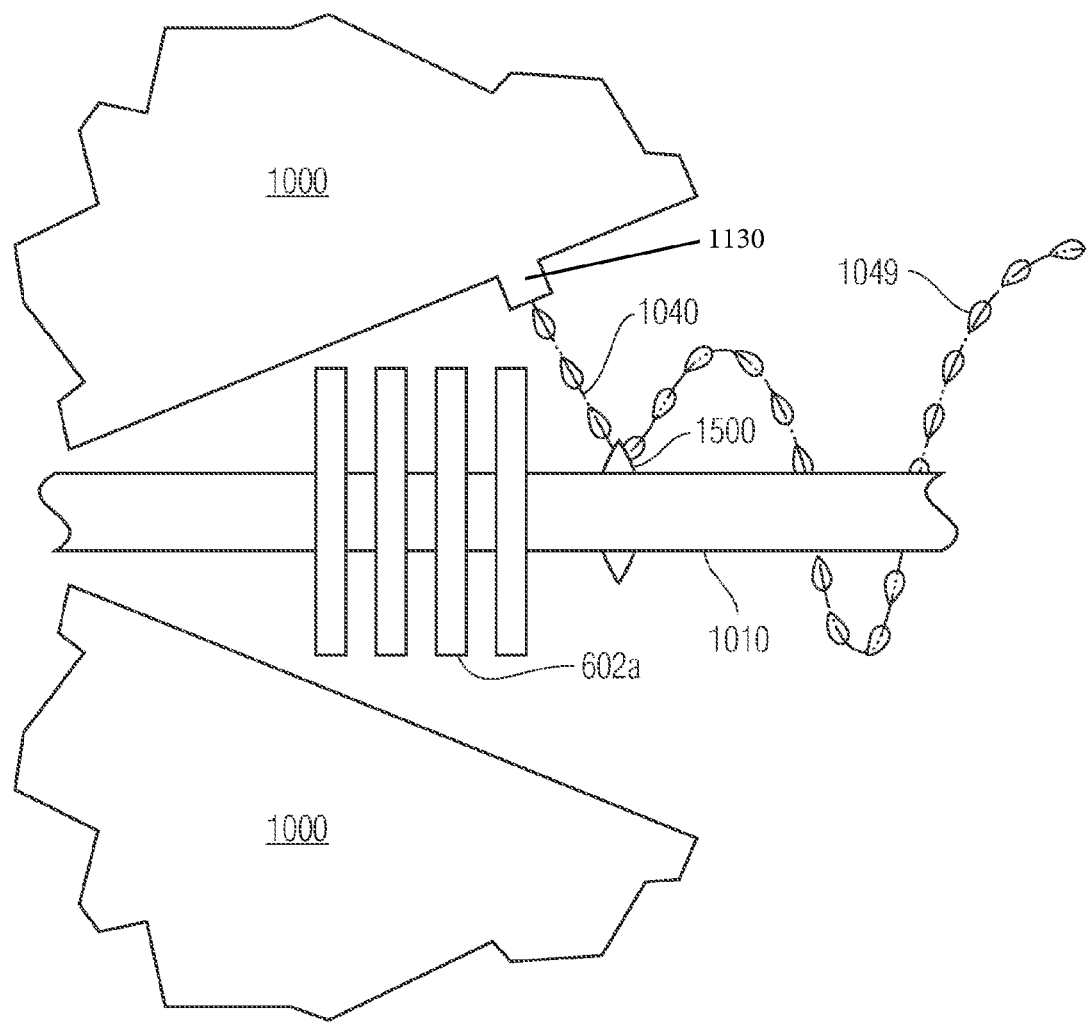
FIG. 13 is side elevation view of a nozzle and liquid impinging means according to another embodiment.

FIG. 13 shows another embodiment in which the nozzle 1130 is part of the casing 1000 and is directed toward the main shaft 1010. In the illustrated embodiment, the nozzle 1130 is angled relative to the main shaft 1010 (at an angle other than 90 degrees) for directing the discharged liquid stream toward the main shaft 1010. A liquid impinging member 1500 that is part of/associated with the main shaft 1010 and as with the other members described herein, the member 1500 causes the liquid stream 1040 to be converted into smaller sized droplets that upon coming into contact with the hot combustion gases is transformed into gas (e.g., steam) 1049 that assumes a swirling pattern.

Figure 15A:
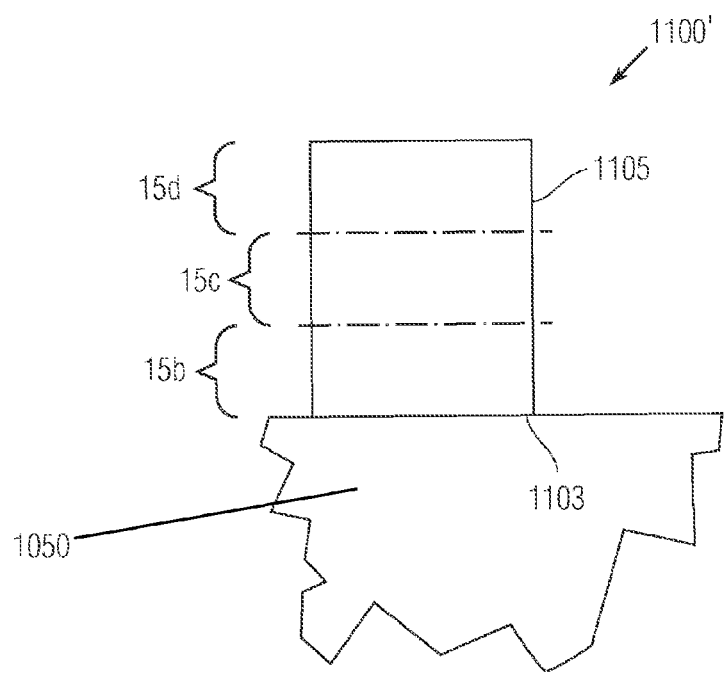
FIG. 15a is front elevation view of a liquid impinging means coupled to the rotating main shaft.
Figures 15B, 15C, 15D:
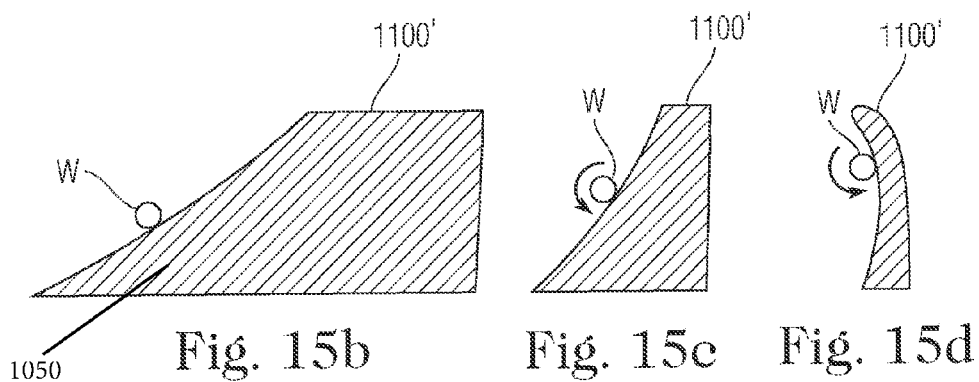

FIGS. 15a-d illustrate another aspect of the present invention. In particular, FIGS. 15a-d show that the cross-section of the surface impinging member 1100', which is similar to member 1100 in location and function, has a variable cross-section in that the cross-section of the member 1100' changes from its bottom edge 1103 to its top edge 1105. FIG. 15b shows the lower section of the member 1100' being defined by a surface that is at a set angle (e.g., 45 degrees) to the central axis of the main shaft 1010. FIG. 15c shows an intermediate section of the member 1100' being defined by a sloped surface having a changing slope (progressively increasing) in a direction toward the top edge 1105. FIG. 15d shows the upper section of the member 1100' that terminates in top edge 1105. This upper section is a steep curved section that has the greatest slope. In FIGS. 15b-d, a liquid (water) droplet W is shown and its relative movement in the sections is shown. In particular, a droplet W striking the lower section will travel along an inclined surface of relatively equal slope and then upon transitioning into the intermediate section, the droplet moves along a surface of increasing slope section, which in combination with rotation of the member 1100', causes the droplet W to rotate and following a swirling pattern. The liquid droplet then flows into the upper section which has a steep curvature and causes the droplet to swirl at greater speed.

FIGS. 15a-d thus illustrate that the liquid impinging member does not have to have a uniform construction from top to bottom, etc.

It will also be appreciated that while the present system is described in terms of being part of a turbine system that is associated with an aircraft, the teachings of the present invention can be incorporated into other applications including but not limited to power generating systems (turbine power plants) and the like.

In yet another embodiment, a longitudinal (axial) distance between the surface impinging member and the exit opening of the internal conduit can be controllably varied. More specifically, the surface impinging member can be disposed within a track or the like to allow the distance between the exit opening and the surface impinging member to be varied. A controller and mechanical actuator can cause such movement and such movement can be controlled based on an operating state of the shaft and/or engine. For example, when the surface impinging member is driven closer to the exit opening, the discharged droplets strike the impinging member quicker and with higher concentration resulting in a higher percentage of spray (reduced droplet size liquid) being formed. Thus, not only can the surface impinging member being configured to rotate independent from and relative to the main shaft 1010 but also the member can be configured to be controllably moved along the central axis of the main shaft (i.e., along the longitudinal (axis) direction of the main shaft so as to vary a distance between the exit opening and the surface impinging member.

While the invention has been described above and illustrated with reference to certain embodiment of the invention, it is to be understood that the invention is not so limited. Modifications and alterations will occur to others upon reading and understanding of the specification including the drawings. For example, the angle a in FIG. 7 can be varied to define different surface flow paths of the liquid and achieve different liquid dispersions (mists/sprays) having different properties.

What is claimed is:

1. A gas turbine system including a casing outer part extending its length and containing a main shaft, compressor section, combustion section, a turbine section defined by a plurality of turbine blades, the system comprising:

a first support structure that is stationary relative to the casing outer part and extends toward the main shaft and supports the main shaft, the first support structure having a bearing associated therewith for holding the main shaft allowing for rotation of the main shaft, wherein the first support structure has at least one internal conduit formed therein for receiving a liquid and defining a flow path for the liquid through the first support structure to an exit opening formed along the first support structure, the exit opening being formed such that liquid discharged therefrom flows in a direction at least substantially parallel to the main shaft and contacts hot combustion gas that surrounds the first support structure and flows also in a direction parallel to the main shaft; and a liquid impinging member that is associated with the main shaft downstream of the exit opening, the liquid impinging member being disposed downstream of the turbine blades, the liquid impinging member rotating with and at a same speed as the main shaft, the liquid impinging member being configured and positioned to contact liquid discharged through the exit opening and cause formation of a liquid spray defined by liquid droplets of reduced size, wherein the spray travels along a swirling path, whereby the hot combustion gas created as a result of fuel burning interact with the liquid spray liquid formed by the liquid impinging member resulting in the liquid being converted into a gaseous phase as a result of consumption of heat energy thereby yielding thrust mechanical energy.

2. The system of claim 1, wherein the internal conduit of the first support structure includes a first section that is formed along a first axis that intersects a central axis about which the main shaft rotates and a second section that extends along a second axis that is parallel to the central axis.

3. The system of claim 2, wherein the exit opening is formed at an open end of the second section of the conduit and is formed along a trailing edge of the first support structure.

4. The system of claim 1, further including a spray nozzle in fluid communication with the exit opening and receiving liquid flowing through the internal conduit and discharging the liquid in spray form.

5. The system of claim 4, wherein the spray generated by the nozzle flows in a direction that is substantially parallel to a central axis about which the main shaft rotates and flows into contact with the liquid impinging member.

6. The system of claim 1, wherein the liquid impinging member comprises a protrusion that extends radially outward from the main shaft and is axially aligned with the exit opening such that the discharged liquid makes contact therewith.

7. The system of claim 6, wherein the protrusion comprises a cylindrical shaped pin.

8. The system of claim 1, wherein the liquid is selected from the group consisting of: water, a water-methanol mix, a water fuel mixture, and a volatile liquid.

9. The system of claim 1, wherein the main shaft includes a fixed annular ring that extends radially outward therefrom, the liquid impinging member extending radially outward from the fixed annular ring and having different dimensions relative to the annular ring.

10. A gas turbine system including a casing outer part extending its length and containing a main shaft, compressor section, combustion section, a turbine section defined by a plurality of turbine blades, the system comprising:

a first support structure that is part of the casing outer part and extends inwardly toward the main shaft and supports the main shaft, the first support structure being disposed downstream of the combustion section of the gas turbine system, the first support structure having a bearing associated therewith for holding the main shaft allowing for rotation of the main shaft, wherein the first support structure has at least one internal conduit formed therein for receiving a liquid and defining a flow path for the liquid through the first support structure to an exit opening formed along a trailing edge of the first support structure, the exit opening being formed such that liquid discharged therefrom flows in a direction at least substantially parallel to the main shaft and contacts hot combustion gas that surrounds the first support structure and flows also in a direction parallel to the main shaft; and a liquid impinging member that is associated with the main shaft downstream of the exit opening, the liquid impinging member being a separate structure relative to the turbine blades and being spaced from the turbine blades and being located downstream of the turbine blades, the liquid impinging member rotating with the main shaft, the liquid impinging member being configured and positioned to contact liquid discharged through the exit opening and cause formation of a liquid spray defined by liquid droplets of reduced size, wherein the spray travels along a swirling path downstream of the turbine blades, whereby the hot combustion gas created as a result of fuel burning interact with the liquid spray liquid formed by the liquid impinging member resulting in the liquid being converted into a gaseous phase as a result of consumption of heat energy thereby yielding thrust mechanical energy;

wherein the bearing is disposed between the exit opening and the main shaft.

11. The system of claim 10, further including a spray nozzle in fluid communication with the exit opening and receiving liquid flowing through the internal conduit and discharging the liquid.

12. The system of claim 11, wherein the liquid discharged by the nozzle flows in a direction that is substantially parallel to a central axis about which the main shaft rotates and flows into contact with the liquid impinging member.

13. The system of claim 11, wherein the spray nozzle and the liquid impinging member are oriented such that the discharged liquid flows directly toward and into contact with the liquid impinging member without obstruction since the spray nozzle directly faces the liquid impinging member without another element disposed therebetween.

14. A gas turbine system including a casing outer part extending its length and containing a main shaft, compressor section, combustion section, a turbine section defined by a plurality of turbine blades, the system comprising:

a first support structure that is part of the casing outer part and extends inwardly toward the main shaft and supports the main shaft, the first support structure being disposed downstream of the combustion section of the gas turbine system, the first support structure having a bearing associated therewith for holding the main shaft allowing for rotation of the main shaft, wherein the first support structure has at least one internal conduit formed therein for receiving a liquid and defining a flow path for the liquid through the first support structure to an exit opening formed along a trailing edge of the first support structure, the exit opening being formed such that liquid discharged therefrom flows in a direction at least substantially parallel to the main shaft and contacts hot combustion gas that surrounds the first support structure and flows also in a direction parallel to the main shaft; and a liquid impinging member that is coupled to the main shaft downstream of the exit opening, the liquid impinging member being a separate structure relative to the turbine blades and being spaced and detached from the turbine blades, the liquid impinging member being disposed downstream of the turbine blades, the liquid impinging member rotating with the main shaft, the liquid impinging member being configured and positioned to contact liquid discharged through the exit opening and cause formation of a liquid spray defined by liquid droplets of reduced size, wherein the spray travels along a swirling path downstream of the turbine blades, whereby the hot combustion gas created as a result of fuel burning interact with the liquid spray liquid formed by the liquid impinging member resulting in the liquid being converted into a gaseous phase as a result of consumption of heat energy thereby yielding thrust mechanical energy;

wherein the bearing is disposed between the exit opening and the main shaft.

\* \* \* \* \*